(12) United States Patent
Nadon et al.

(10) Patent No.: US 7,478,370 B2
(45) Date of Patent: Jan. 13, 2009

(54) RELATIONSHIP MANAGEMENT FOR DATA MODELING IN AN INTEGRATED DEVELOPMENT ENVIRONMENT

(75) Inventors: Gaetan Nadon, Thornhill (CA); Dirk A. Seelemann, Thornhill (CA); David A. Spriet, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 10/752,964

(22) Filed: Jan. 7, 2004

(65) Prior Publication Data

US 2005/0149911 A1 Jul. 7, 2005

(30) Foreign Application Priority Data

Dec. 17, 2003 (CA) .................................. 2453722

(51) Int. Cl.
*G06F 9/44* (2006.01)
*G06F 17/00* (2006.01)
(52) U.S. Cl. .................. 717/126; 717/120; 707/102
(58) Field of Classification Search .................. 717/100, 717/104, 105, 106, 120–123, 126; 715/511; 707/102

See application file for complete search history.

(56) References Cited

U.S. PATENT DOCUMENTS 5,182,807 A * 1/1993 Mizuse et al. ................ 717/122

(Continued)

FOREIGN PATENT DOCUMENTS

EP 321000 A2 * 6/1989

OTHER PUBLICATIONS

"Troubleshooting LNK2001 or L2029 Unresolved External Errors", May 31, 2005, Microsoft, Microsoft Knowledge Base Article ID 138400, Accessed Aug. 30, 2007 at <http://support.microsoft.com/kb/138400>.*

(Continued)

*Primary Examiner*—Tuan Q. Dam
*Assistant Examiner*—J. Derek Rutten
(74) *Attorney, Agent, or Firm*—Robert E. Straight, II; Winstead, P.C.

(57) ABSTRACT

A method of validating a relationships table. The method includes generating a relational schema of symbols in the program code file based on a framework for models in the integrated development environment, the schema including two related tables. The method further includes determining a relationship between the two tables. Further, the method includes adding definitions from the program code file for symbols in the relational schema to a definition set retaining definitions of symbols. Additionally, the method includes producing proxy definitions for use with the definition set for each symbol in the program code file without a definition in the definition set. Furthermore, the method includes generating the relationships table in the relational schema containing the relationship between the two tables. Further, the method includes validating the relationships table by matching the symbols definitions and references, where the validation removes public symbols and referenced symbols from the relationships table.

4 Claims, 8 Drawing Sheets

U.S. PATENT DOCUMENTS

| | | | | |
|---|---|---|---|---|
| 5,481,722 | A * | 1/1996 | Skinner | 717/122 |
| 5,642,511 | A * | 6/1997 | Chow et al. | 717/105 |
| 5,642,514 | A * | 6/1997 | Peckham | 717/144 |
| 5,937,189 | A * | 8/1999 | Branson et al. | 717/101 |
| 6,182,281 | B1 * | 1/2001 | Nackman et al. | 717/116 |
| 6,182,283 | B1 * | 1/2001 | Thomson | 717/153 |
| 6,351,848 | B1 * | 2/2002 | Chessin | 717/140 |
| 6,542,167 | B1 * | 4/2003 | Darlet et al. | 715/762 |
| 6,757,887 | B1 * | 6/2004 | Kaplan et al. | 717/106 |
| 6,966,048 | B2 * | 11/2005 | Bowers | 717/101 |
| 2002/0046400 | A1 * | 4/2002 | Burch | 717/154 |
| 2003/0018951 | A1 * | 1/2003 | Srivastava et al. | 717/101 |
| 2003/0101195 | A1 * | 5/2003 | Linhart | 707/102 |
| 2003/0233585 | A1 * | 12/2003 | Quick et al. | 713/202 |
| 2005/0091589 | A1 * | 4/2005 | Ramarao | 715/522 |

OTHER PUBLICATIONS

Dees et al., "Suitability of Microsoft Visual C++ Professional???", Jan. 24, 1996, comp.lang.c++ Usenet News, acessed Aug. 30, 2007 at <http://groups.google.com/group/comp.lang.c++/browse_thread/thread/8c84913b25a7d993/a8b23572698d97c6?Ink=st&q=suitability+of+microsoft+visual+c%2B%2B+1.0+professional&rnum=1#a8b23572698d97c6>.*

Horwitz and Teitelbaum, "Generating Editing Environments Based on Relations and Attributes", Oct. 1986, ACM Transactions on Programming Languages and Systems, vol. 8, No. 4, pp. 577-608.*

Muchnick, "Advanced Compiler Design and Implementation", 1997, Morgan Kaufmann Publishers, Inc., Chapter 3.*

* cited by examiner

RELATIONSHIP MANAGEMENT FOR DATA MODELING IN AN INTEGRATED DEVELOPMENT ENVIRONMENT

FIELD OF THE INVENTION

The present invention relates to the field of data modeling in integrated development environments.

BACKGROUND OF THE INVENTION

An integrated development environment (IDE) provides a set of tools to assist in the development of a computer program. Such an environment generally supports various tasks and often various programming languages. Given the integration between various files forming a computer program project, each time a file is changed the file is validated to ensure that information on the file in the environment is correct. The validation involves parsing each file that changed as well as each file that the changed file references. If there are N changed files that all reference each other then N*N parses are performed. Since file-to-file dependencies may not be maintained, all of these files are generally parsed. To ensure correctness of the data in a workspace in the IDE, the time for such validation is not amortized over other operations. With a workspace composed of many files or large files, it can be cumbersome to wait for validation of a file, involving completely parsing many files, after each change before proceeding with other actions.

SUMMARY OF THE INVENTION

In accordance with an aspect of the present invention there is provided a method for validating a relationships table comprising generating a relational schema of symbols in the program code file based on a framework for models in the integrated development environment, the schema comprising two related tables, where the two related tables comprise a public symbols table and a referenced symbols table. The method further comprises determining a relationship between the two tables in the relational schema. Further, the method comprises adding definitions from the program code file for symbols in the relational schema to a definition set retaining definitions of symbols. Additionally, the method comprises producing proxy definitions for use with the definition set for each symbol in the program code file without a definition in the definition set. Furthermore, the method comprises generating the relationships table in the relational schema containing the relationship between the two tables. Further, the method comprises validating the relationships table by matching the symbols definitions and references, where the validation removes public symbols and referenced symbols from the relationships table.

Other aspects and features of the present invention will become apparent to those ordinarily skilled in the art upon review of the following description of specific embodiments of the invention in conjunction with the accompanying figures.

DETAILED DESCRIPTION OF EMBODIMENTS OF THE PRESENT INVENTION

Figure 1:
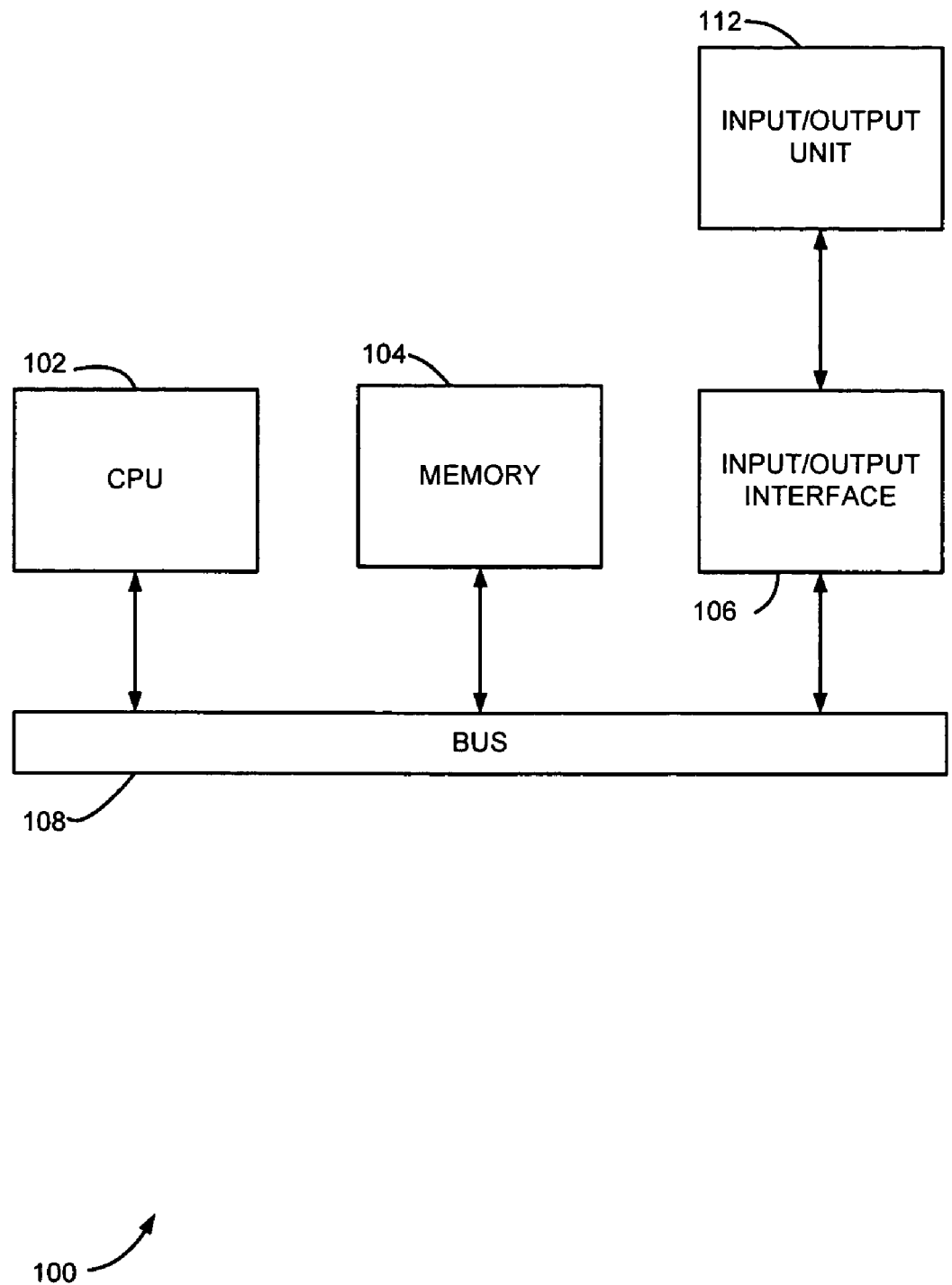
FIG. 1 is an exemplary computing environment in which the present invention may be implemented.

FIG. 1 illustrates a configuration of a computer 100 in which the present invention may be implemented.

The computer 100 includes a central processing unit (CPU) 102, a memory 104, an input/output interface 106 and a bus 108. The CPU 102, the memory 104 and the input/output interface 106 are connected with one another via the bus 108. The input/output interface 106 is configured so that it can be connected to an input/output unit 112.

The present invention may be embodied in a program stored in, for example, the memory 104. Alternatively, the present invention may be recorded on any type of recording medium such as a magnetic disk or an optical disk. The present invention recorded on such a recording medium is loaded to the memory 106 of the computer 100 via the input/output unit 112 (e.g. a disk drive).

The CPU 102 can be a commercially available CPU or a customized CPU suitable for operations described herein. Other variations of CPU 102 can include a plurality of CPUs interconnected to coordinate various operations and functions. The CPU 102 contains resources for the execution of the present invention including registers 110 that enable basic functions such as placing a value into a specified register (referred to as a "load" operation), copying a value stored in a specified register to a specified memory location (referred to as a "store" operation), and performing arithmetic operations, such as addition and multiplication, on values stored in memory locations and registers. The computer 100 serves as an apparatus for performing the present method by the CPU 102 executing the present invention.

Figure 2:
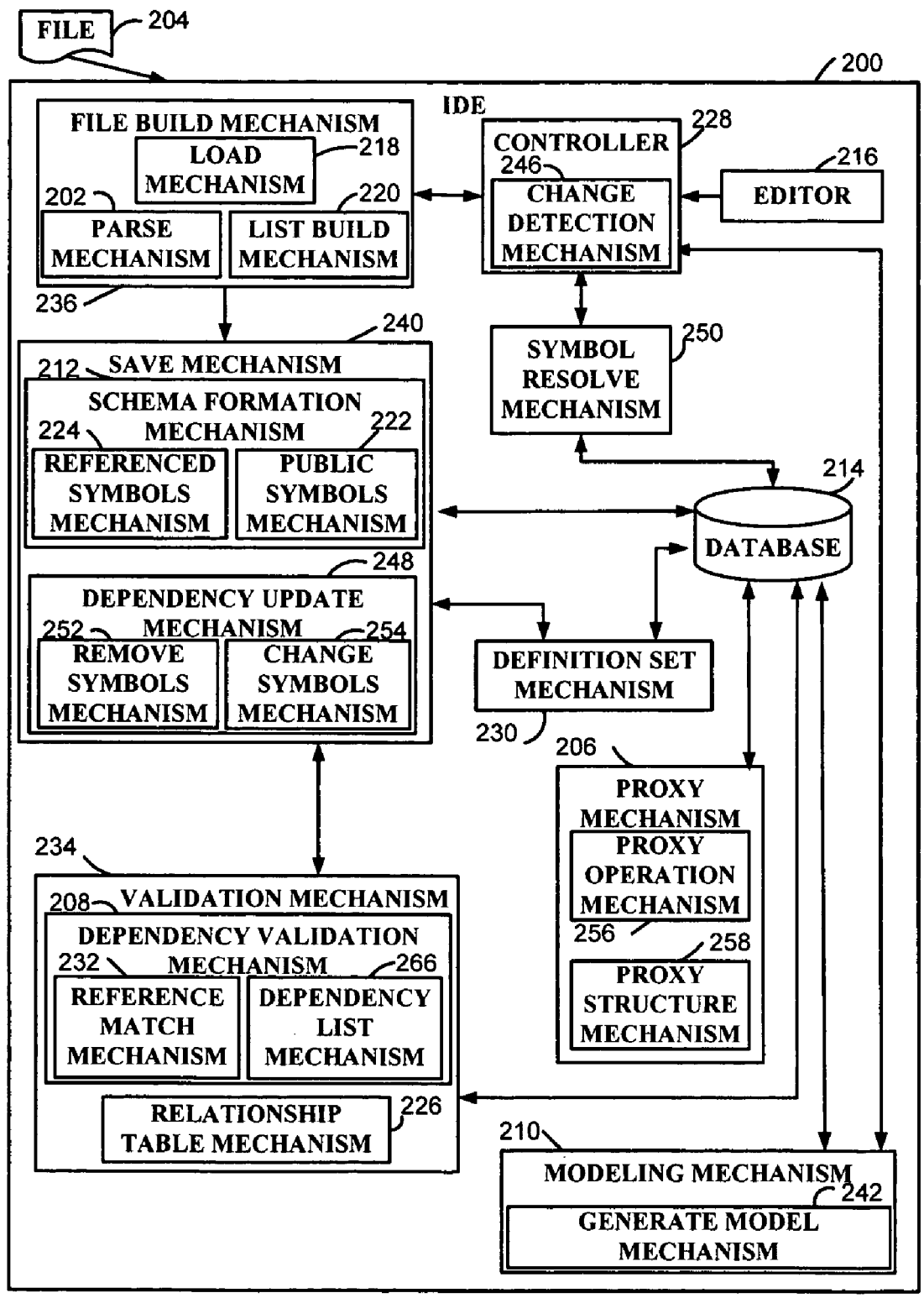
FIG. 2 is a system diagram of an integrated development environment including a system for incorporated files thereinto.

FIG. 2 is a system diagram of an integrated development environment (IDE) 200 in which a computer program may be represented as a model showing components of the program (e.g. objects in an object-oriented project) and relationships therebetween. The model may be presented in the IDE 200 as a graph data structure of components in which the components have named properties and relationships to other components. Each model may be composed of many files, each of which may contain multiple components. The model is created when files that form the project are incorporated into the IDE 200. The IDE 200 includes a workspace (not shown) in which multiple models may be presented to a user.

The IDE 200 includes a controller 228, a file build mechanism 236, a save mechanism 240, a modeling mechanism 210, a validation mechanism 234, a symbol resolve mechanism 250, a proxy mechanism 206, a definition set mechanism 230, an editor 216 and a database 214. The controller 228 coordinates the various other components in the IDE 200 and directs the data and control flow therebetween. The file build mechanism 236 incorporates a new or changed program code file 204 into the IDE 200. The save mechanism 240 saves the incorporated file 204 into the database 214. The modeling mechanism 210 creates a model from the file 204, including adding new files to the model and incorporating changes to existing files into the model. The validation mechanism 234 validates the file 204 to provide all current references and definitions of data and objects to maintain relationships between files in the IDE 200. The symbol resolve mechanism 250 makes resolutions in the file 204 as to the definition of objects and data therein. The definition set mechanism 230 maintains a definition set with definitions from files in the IDE 200. The definition set is a collection of symbol definitions that provides a view of saved content in the IDE 200 workspace. The editor 216 enables a file in a model to be changed.

The controller 228 comprises a change detection mechanism 246 that monitors the workspace of the IDE 200. Each model in the workspace is composed of multiple files. The change detection mechanism 246 monitors the status of each of the models and the files of which they are composed to detect a change in either the model or in one of the files. This change can be in the form of a request to add a new file to a model or to the workspace, a request to remove a file from a model or the workspace, or an editorial change to a file in one of the models in the workspace (such as would be implemented through the editor 216). Monitoring a change in a file in one of the models in the workspace may be performed by monitoring the profile of the file currently in the workspace and comparing it with the profile of the actual file, assessing file size and last save data and time.

When a request to add the new or changed file 204 in one of the models is detected by the change detection mechanism 246, the controller provides the file build mechanism 236 with the location of the file 204. If the request detected by the change detection mechanism 246 is to remove the file 204 from one of the models or the workspace, then the location and identity of this file 204 is provided directly to the save mechanism 240.

The file build mechanism 236 comprises a load mechanism 218, a parse mechanism 202 and a list build mechanism 220, all of which function to incorporate the new or changed file 204 into the IDE 200. The load mechanism 218 accepts the file 204 and creates an input data stream from the contents of the file 204. The list build mechanism 220 identifies all references and definitions of symbols, such as data and objects, and creates a list of public symbols and referenced symbols in the file 204. The public symbols in the file 204 are definitions of symbols (e.g. data and objects) that are accessible to other files. Referenced symbols in the files 204 represent those symbols used by the file 204 but defined elsewhere (e.g. public symbols from other files). The parse mechanism 202 parses the file 204 to identify and extract references and definitions of symbols therein. The references and definitions may be determined by searching for symbols in the input stream recognized as providing a reference or definition.

The parse mechanism 202 parses the file 204 to obtain definitions for public symbols and information on referenced symbols. The information on the referenced symbols may include any interface information that can be garnered from the reference in the file 204.

The lists (public symbols and referenced symbols) are provided to the save mechanism 240 for storage in the database 214. The save mechanism 240 comprises a schema formation mechanism 212, and a dependency update mechanism 248. If the file 204 is a new file being incorporated into the IDE 200 then the list is provided directly to the schema formation mechanism 212; otherwise, the list is provided to the dependency update mechanism 248. The schema formation mechanism 212 comprises a public symbols mechanism 222, and a referenced symbols mechanism 224 for creating a relational schema in the database 214 based on the contents of the public symbols list and the referenced symbols list.

The schema formation mechanism 212 receives the lists and examines the database 214 based on the lists. The database 214 contains a public symbols table formed with public symbol definitions and the location of the file 204 in which the symbol is defined, a referenced symbols table with the symbol references from the list and the location of the file 204 that is referencing the symbols, and a definition set containing the definition for all symbols that have been defined or referenced in the file 204 forming the model. The location of the file 204 in both the public symbol table and the referenced symbols table may be in the form of a universal resource indicator (URI) identifying the file that defines the symbol as well as the location of the file. An identifier for the file 204 may be included in the public symbols table and the referenced symbols table in the form of a name, location, etc.

The schema formation mechanism 212 searches the database 214 to determine if the entries in the public symbols and the referenced symbols list are in the definition set. This information is provided to the public symbols mechanism 222 and the referenced symbols mechanism 224 along with the appropriate list.

The public symbols mechanism 222 assesses the type of entry for the public symbol in the definition set. If a previous file contained the definition for the public symbol then the definition set will have an actual definition for that symbol. In this case there may be two definitions for the public symbol in the model. This will prompt an error message to be presented to the user indicating that there are two definitions for a public symbol. If the previous file only contained a reference to the symbol then there may be a proxy definition for the symbol in the definition set. The proxy definition includes any information about the symbol that can be garnered from the reference. The proxy definition shows the known public interface but not necessarily the body of the symbol definition. If the entry in the definition set is a proxy definition then the public symbols mechanism 222 obtains file parsing data from the parse mechanism 202. The definition of the public symbol is obtained from the parsed data. This definition is added to the definition set to replace the proxy definition so that the definition set now contains an actual definition of the public symbol.

If the public symbol does not have a definition in the definition set then the public symbols mechanism 222 obtains the public symbols definition from the parse mechanism 202. This definition is added to the definition set.

The pubic symbols mechanism 222 also stores the entries of the public symbols list from the list build mechanism 220 in the public symbols table in the database 214.

The referenced symbols mechanism 224 also assesses the type of entry for the referenced symbols in the definition set. If a previous file contained the definition for the referenced symbol then the definition set contains an actual definition for the referenced symbol.

If the definition set contains the actual definition for the symbol, the existing definition in the definition set is retained. If the entry in the definition set is a proxy definition then the existing proxy definition is replaced in the set. If the referenced symbol does not have a proxy or actual definition in the set then a proxy definition is created for the definition set. The proxy mechanism 206 in the IDE 200 creates the proxy definition.

After the public symbols table and the referenced symbols table have been created or populated based on the file 204, then the tables are validated by the validation mechanism 234. A map of the relationships between files is created in the database 214 by the validation mechanism 234.

The public symbols table and the referenced symbols table provide a store of the public symbol definitions and references to symbols in the file 204 so that the file 204 is not parsed by the file build mechanism 236 every time information on the dependencies of the file 204 is requested.

If the file 204 is a previously incorporated file that has been changed or the request received by the controller 228 is to remove the file 204, then the dependency update mechanism 248 coordinates the save and update process. The dependency update mechanism 248 comprises a remove symbols mechanism 252 for removal of symbols in the file 204 from the database 214 and a change symbols mechanism 254 for coordinating changes.

The remove symbols mechanism 252 receives the location and identifier for the file 204 to be removed from a model or the workspace. The remove symbols mechanism 252 removes all public symbols defined in the file 204 from the public symbols table and all referenced symbols in the file 204 are removed from the referenced symbols table. The remove symbols mechanism 252 provides the validation mechanism 234 with the location and identifier of the file 204 so that the dependencies of other files in the model can be updated and validated based on the removal of this file 204.

The change symbols mechanism 254 receives the location and identifier for the file 204 in the model or workspace that has been changed. The change symbols mechanism 254 provides the location and identifier for the file 204 to the remove symbols mechanism 252 so that all public symbols defined in the file 204 are removed from the public symbols table and all referenced symbols in the file 204 are removed form the referenced symbols table. As with the case of file removal, the remove symbols mechanism 252 provides the validation mechanism 234 with the location and identifier of the file 204 so that the dependencies of other files in the model can be updated and validated based on the removal of this file 204. All of the existing information on the file 204 is removed from the public symbols table and the referenced symbols table so that these tables do not contain old information on the file 204 that has been changed. After this old information has been removed the change symbols mechanism provides the location and identifier for the file 204 that has been changed to both the public symbols mechanism 222 and the referenced symbols mechanism 224 so that the changed file 204 can be parsed and the public symbol definitions and referenced symbols in the file 204 can be included in the public symbols table and the referenced symbols table.

The public symbols mechanism 222 interfaces with the definition set mechanism 230 to examine the definition set to determine if the public symbols in the changed file 204 are defined in the definition set. The presence of a previous public symbols definition prompt the public symbols mechanism 222 to produce an error message. If the public symbol is not defined in the definition set then the public symbols mechanism 222 co-ordinates parsing of the file 204 with the parse mechanism 202 to extract the definition from the file 204. This extracted definition is provided to the definition set mechanism 230 for insertion into the definition set.

The referenced symbols mechanism 224 likewise interfaces with the definition set mechanism 230 to examine the definition set to determine if the referenced symbols are defined therein. The presence of an existing definition for a referenced symbol in the definition set is assessed to determine if it is a proxy or actual definition. An actual definition is retained whereas a proxy definition is replaced by a new proxy definition from the file 204. If a referenced symbol definition does not exist in the definition set then one is created by the proxy mechanism 206. This proxy definition is provided to the definition set mechanism 230 for insertion into the definition set.

The definition set mechanism 230 interfaces with the public symbols mechanism 222 and the referenced symbols mechanism 224 to add and maintain definitions for the public symbols and the referenced symbols in the definition set in the database 214.

After the public symbols table and the referenced symbols table have been repopulated, then the tables are validated by the validation mechanism 234. The map of the relationship between the tables is maintained by the validation mechanism 234.

The proxy mechanism 206 creates proxy definitions, or skeleton definitions, for symbols in the file 204 that are not resolved. A proxy definition includes a definition of the symbol according to the information in the reference in the file 204. This proxy definition accelerated parsing of a file by enabling parts of the referents of the symbol to be determined from the public symbols table. The proxy mechanism 206 comprises a proxy structure mechanism 258 and a proxy operation mechanism 256.

The proxy mechanism 206 receives information from the referenced symbols mechanism 224 when a referenced symbol that does not have a definition in the definition set is encountered. The information provided by the referenced symbols mechanism 224 may include sections of the file in which the referenced symbol is used as well as the context in which it is used (i.e. other associated symbols and relevant information on these symbols). From this information the proxy structure mechanism 258 and the proxy operation mechanism 256 create a proxy definitions for the referenced symbol that shows an interface for the symbol but not the body of the definition of the symbol.

The proxy mechanism 206 extracts all reference information for the symbol from the file 204 and provides this information to the proxy structure mechanism 258 and the proxy operation mechanism 256. The proxy structure mechanism 258 searches the references to determine the structure of the symbol, including what is the type of the symbol (i.e. object or specific type of data) and what might be contained in the symbol (i.e. data in an object). The proxy operation mechanism 256 searches the references to determine the functionality of the symbol including what inputs might be accepted and what outputs might be produced (generally the type of the input and output). Such information may be obtained from the public symbols table in the database 214.

If there was a previous proxy definition in the definition set the proxy mechanism 206 may either replace the existing definition with a new definition or may use the information from the file 204 on the referenced symbol to enhance the existing definition.

The proxy mechanism 206 may also include the proxy definition in the file 204 that is used in the workspace of the IDE 200 to accelerate parsing at a later time. A referenced symbol with a definition in the definition set provides a dangling reference since the definition for the symbol is not known in the workspace of the IDE 200. Thus, since a definition is created (a proxy definition) for the symbol, memory space in which a value can be retained is provided for the symbol.

The validation mechanism 234, used after the public symbols table and the referenced symbols table have been populated, creates and maintains a relationship table, thus providing the map of relationships between files and the tables. The validation mechanism 234 comprises a relationship table mechanism 226 and a dependency validation mechanism 208 which comprises a reference match mechanism 232 and a dependency list mechanism 266.

The relationship table mechanism 226 creates the relationship table in the database 214 to provide a matching of the public symbols table with the referenced symbols table. The relationship table shows where a symbol is publicly defined and where the symbol is referenced. The relationship table may be used for creating a dependency graph for a model.

The relationship table mechanism 226 is provided with the cause of the change (i.e. add, remove, or change) and an identifier for the file (i.e. name, location, etc.) If the cause is remove or change then the relationship table mechanism 226 removes the public symbols defined in the file 204 from the relationship table as well as all references to symbols in the file 204. References to the public symbols in the file 204 are validated by the dependency validation mechanism 208.

The dependency validation mechanism 208 checks the dependencies between files to determine the effects of the change. The reference match mechanism 232 receives the location and indicator for the file 204 and checks the relationship table to determine if any files in the model depend on public symbols that were defined by the file 204. If such a dependency exists, the newly added public symbol in the public symbol table may resolve previously unresolved dependencies or may cause a previously resolved dependency to be multiply resolved. A dependency in a file is considered to be resolved when the location of the file containing the actual definition (as opposed to proxy definitions) of the symbol which is depended upon is known. Conversely, a dependency is considered to be unresolved when the definition of the symbol in the file is not located in the public symbols table, thus is not known. A multiply resolved dependency is considered to be when there appears to be multiple definitions of the symbol in the public symbol table. The reference match mechanism 232 examines the public symbol table, the reference symbols table and the relationship table to determine if all of the symbols referenced by the file are defined. If there is a reference to an undefined symbol in the file or if there appears to be multiple definitions of a symbol, then an error may be generated to inform the user of the situation. The validation mechanism 234 stores resolved and multiply resolved dependencies in the relationship table as input for future change validations.

The reference match mechanism 232 performs matching by one of two ways: based on the referenced symbols table or based on the public symbols table. When the reference match mechanism 232 performs matching based on the referenced symbols table, the referenced symbols table is searched to obtain all references to symbols made by the file 204. For each reference, the public symbols table is searched to locate matching symbols that resolve the reference. This produces a location of the definition of each symbol referenced by the file 204. The location of these files are inserted in the relationship table as being "down" files to the current file 204 as they are the files on which the current file 204 is dependent. If there is not exactly one match for the reference symbol in the public symbols table then an error has occurred and a user is informed of this situation. When the reference match mechanism 232 performs matching based on the public symbols table, the public symbols table is searched to obtain all public symbols defined in the file 204. For each reference, the referenced symbols table is searched to locate references to the symbols defined by the file 204. Each file containing a reference to a symbol define in the current file 204 is added to the relationship table as "up" files for the current file 204 since these files depend on the current file.

The dependency list mechanism 266 creates a dependencies list for the file 204 that is stored in the database 214. The dependencies list contains a list of all files that depend on the symbols defined by the file 204. The dependencies list may be an existing list that is maintained or it may be the result of a query made to the relationship table each time the dependency information is requested.

The modeling mechanism 210 creates and updates the model based on the files that form the model. The modeling mechanism 210 comprises a generate model mechanism 242. The generate model mechanism 242 generates a new model on the basis of newly incorporated files or updates the model on the basis of changed or removed files.

During the creation, changing or parsing of the model, the definition of a symbol referenced by the file 204 may be requested. The symbol resolve mechanism 250 obtains such definitions for references from the definition set in the database 214.

Figure 3A:
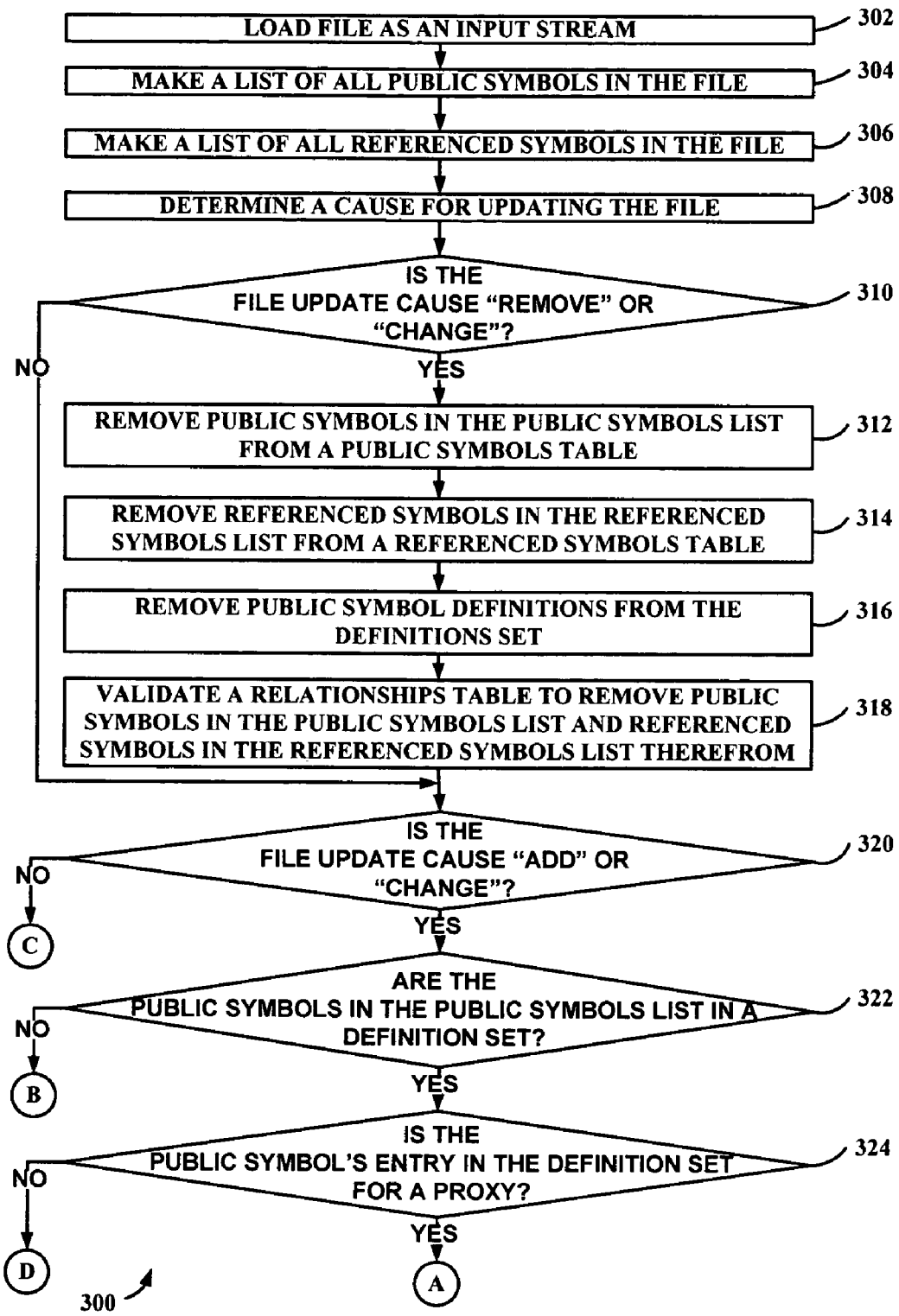
FIG. 3A to C show a method for incorporating a file into an integrated development environment.
Figure 3B:
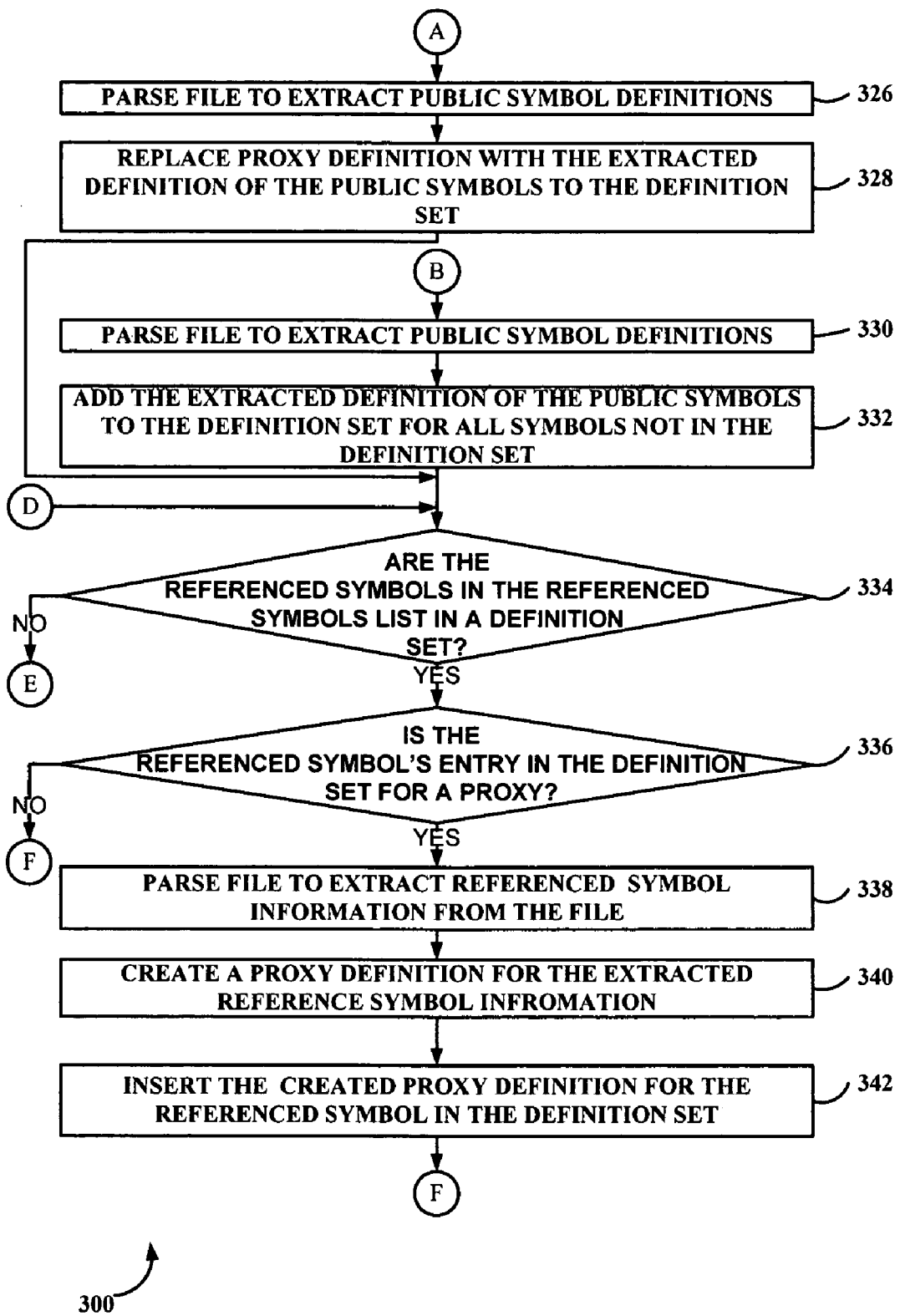
Figure 3C:
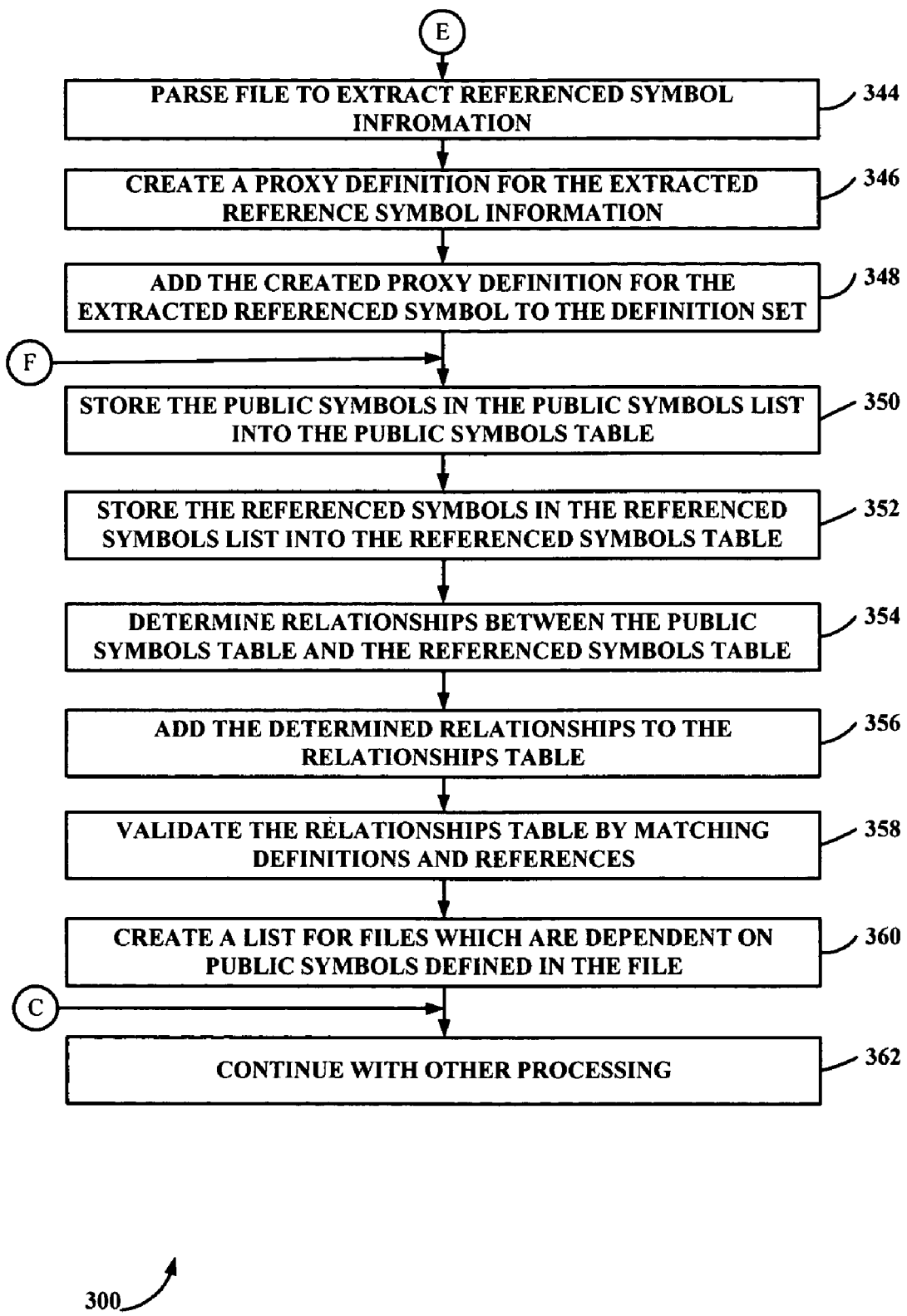

FIGS. 3A to C show a method 300 for incorporating the file 204 into the integrated development environment 200 shown in FIG. 2. The file 204 is loaded into the IDE 200 as an input stream in step 302. A list of all of the public symbols in the file 204 is made in step 304 and a list of all of the referenced symbols in the file 204 is made in step 306.

The cause for updating the file 204 in the IDE 200 is determined in step 308 as being one of "remove," "change," or "add." If the file 204 was updated because of a change to the file 204 or a request to removed the file 204 from the model or because of a change in the file 204, as determined in step 310, then the public symbols in the list are removed from the public symbols table in step 312. The referenced symbols are removed from the referenced symbols table in step 314. The definitions in the definition set for the public symbols in the list are removed in step 316. The relationships table is validated in step 318 to remove public symbols in the public symbols list and referenced symbols in the referenced symbols list from the relationships table.

If the reason for updating the file 204 is because the file 204 changed or was added, as determined in step 320, then it is determined in step 322 if the public symbols in the file 204 are defined in the definition set. If the public symbols are defined in the definition set then it is determined in step 324 if this is an actual definition or a proxy definition. If the definition is a proxy definition then the file 204 is parsed to extract the actual definition of the public symbol therefrom in step 326. The actual definition is then inserted into the definition set to replace the proxy definition in step 328.

If the public symbol was not in definition set as determined in step 322 then the file 204 is parsed in step 330 to extract the public symbol definition. The extracted public symbol definition is added to the definition set in step 332.

After the public symbol definitions have been added to the definition set, or if a previous entry in the definition set for the public symbol was an actual definition, step 334 determines if there are referenced symbols in the referenced symbols list that have definitions in the definition set. If these definitions are proxy definitions, as determined in step 336, then the file 204 is parsed to extract information on the referenced symbol therefrom in step 338. A proxy definition is created in step 340 from this extracted information and is inserted in the definition set in step 342. The created proxy definition may either be a new proxy definition based solely on the information obtained from the parse in step 338 or the existing proxy definition may have been enhanced by the extracted information.

If there is no definition in the definition set for the referenced symbol as determined in step 334 then the file 204 is parsed to extract information on the referenced symbol in step 344. This information is used to create a proxy definition for the referenced symbol in step 346 which is added to the definition set in step 348.

After definitions have been added to the definition set for referenced symbols or a previous definition for the referenced symbol in the definition set was an actual definition or there were no referenced symbols in the file 204, the public symbols in the public symbols list are stored in the public symbols table in the database 214 in step 350. The referenced symbols in the referenced symbols list are stored in the referenced symbols table in step 354.

Relationships between the public symbols in the public symbols table and referenced symbols in the referenced symbols table are determined in step 354. These relationships are inserted into the relationships table in step 356.

The relationships table is validated in step 358 by matching symbols definitions and references. This validation may be in either an upwards direction (as shown in FIG. 5) or a downwards direction (as shown in FIG. 4) or both.

A list of the files that are dependent on the public symbols in the file 204 is created in step 360. After the dependencies list is created or if the reason for updating the file 204 was not "change" or "add" as determined in step 320, then processing of the model in the IDE 200 continues in step 362.

Figure 4:
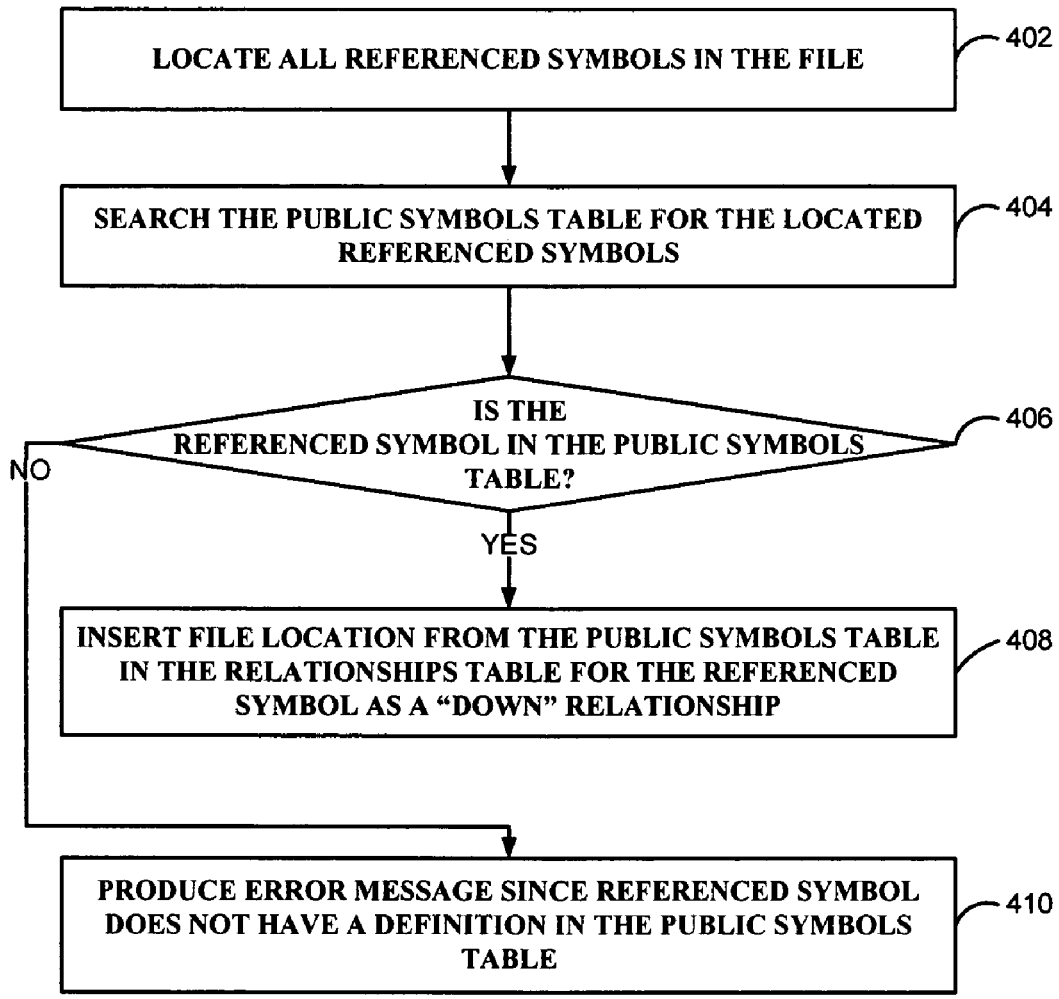
FIG. 4 shows a method for validating a relationships table in an upwards direction.

FIG. 4 shows a method 400 for validating the file 204 in a downward direction. All of the referenced symbols in the file 204 are located in step 402. The public symbols table is searched in step 404 to locate the referenced symbols from the file 204 to see if the file containing the definition for the referenced symbol can be determined. If the referenced symbol is found in the public symbols table, as determined in step 406, then the file location of the referenced symbol definition is inserted in the relationships table for the referenced symbol as being a "down" file, or the file containing the actual definition for the symbol in step 408. If the referenced symbol is not found in the public symbols table, as determined in step 406, then an error message is produced for the user since there is no definition for the referenced symbol in the IDE 200 in step 410.

Figure 5:
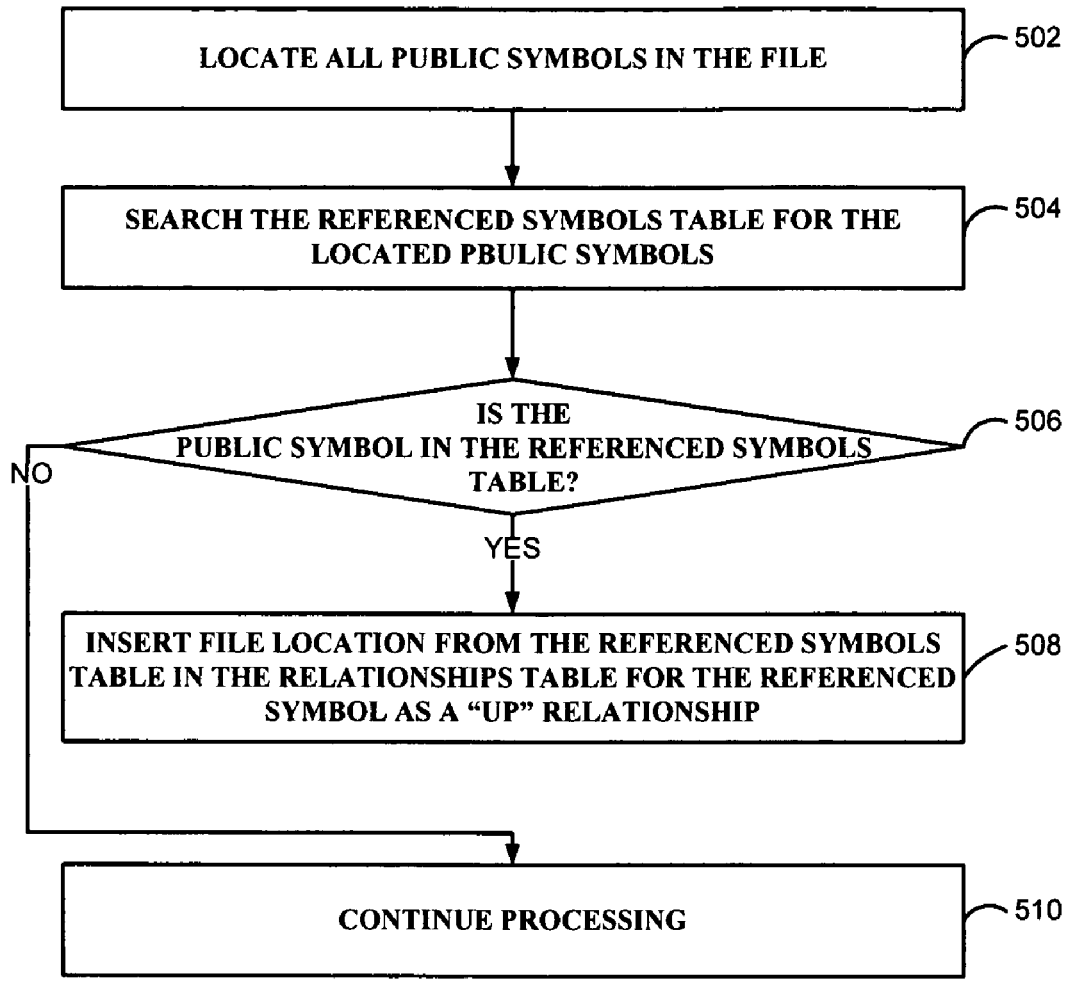
FIG. 5 shows a method for validating the relationships table in a downwards directions.

FIG. 5 shows a method 500 for validating the file 204 in the upward direction. All of the public symbols in the file 204 are located in step 502. The referenced symbols table is searched in step 504 to locate the public symbols from the file 204 to see if there are any files that reference or use the public symbols. If the public symbol is found in the referenced symbols table, as determined in step 506, then the location of the file containing the reference of the public symbol is inserted in the relationships table for the public symbol as being an "up" file, or a file containing a reference to the public symbol in step 508. If the public symbol is not found in the referenced symbols table then processing of the model in the IDE continues in step 510.

Figure 6:
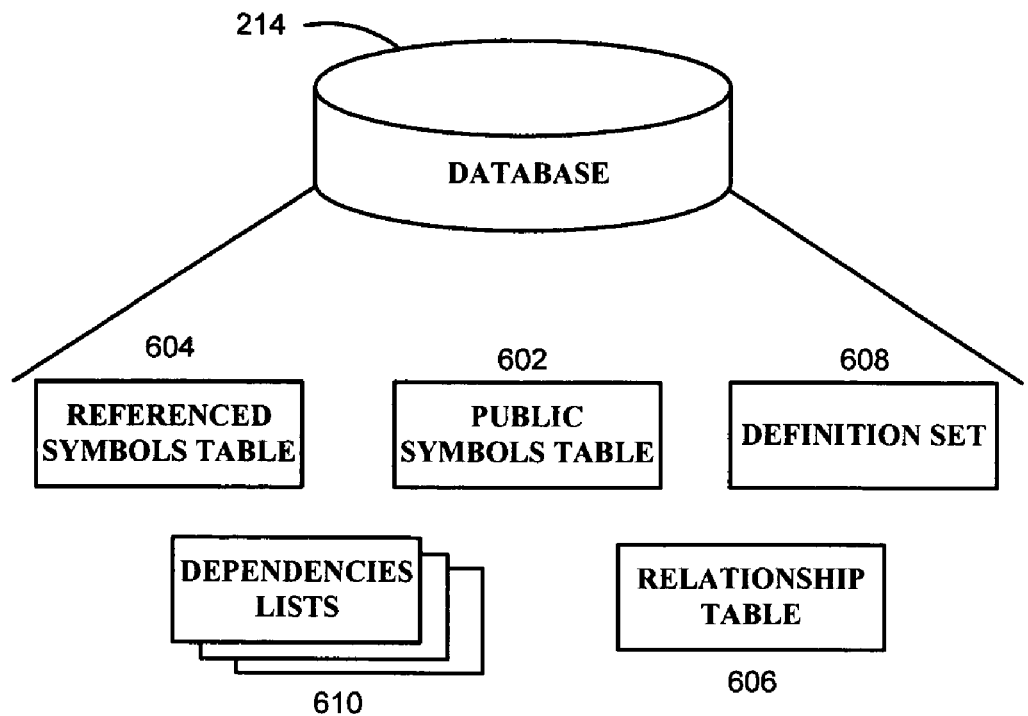
FIG. 6 shows a pictorial representation of the contents of a database of the integrated development environment of FIG. 2.

FIG. 6 is a pictorial representation of the contents of the database 214 of the IDE 200. The database 214 contains the public symbols table 602, the referenced symbols table 604, the relationships table 606, the definition set 608 and the dependencies lists 610.

It is apparent to one skilled in the art that numerous modifications and departures from the specific embodiments described herein may be made without departing from the spirit and scope of the invention.

The invention claimed is:

1. A method for validating a relationships table, comprising:
   generating a relational schema of symbols in the program code file based on a framework for models in the integrated development environment, the schema comprising two related tables, wherein said two related tables comprise a public symbols table and a referenced symbols table;
   determining a relationship between the two tables in the relational schema;
   adding definitions from the program code file for symbols in the relational schema to a definition set retaining definitions of symbols; and
   producing proxy definitions for use with the definition set for each symbol in the program code file without a definition in the definition set:
   generating the relationships table in the relational schema containing the relationship between the two tables; and
   validating the relationships table by matching the symbols definitions and references, wherein the validation removes public symbols and referenced symbols from the relationships table.

2. The method according to claim 1 wherein the step of generating the relational schema comprises:
   generating the public symbols table in the relational schema for the public symbols in the program code file, the public symbols being symbols having a definition in the program code file; and
   generating the referenced symbols table in the relational schema for the referenced symbols in the program code file, the referenced symbols being symbols only referred to in the program code file.

3. The method according to claim 1 wherein the program code file contains the public symbols having a definition in the program code file and the referenced symbols being only referred to in the program code file, and wherein the step of adding definitions comprises:
   parsing the program code file to extract definitions for the public symbols therein; and
   adding the extracted definitions to the definition set.

4. The method according to claim 1 wherein the program code file contains the public symbols having a definition in the program code file and the referenced symbols being only referred to in the program code file wherein the step of producing proxy definitions comprises:
   determining if the definition set contains a definition for the referenced symbols;
   parsing the program code file to extract information about the referenced symbols therefrom;
   formulating a proxy definition for the referenced symbols without a definition in the definition set based on the extracted information;
   adding the formulated proxy definition to one of the definition set or a changed program code file.

* * * * *